United States Patent
Botti et al.

(10) Patent No.: US 6,230,494 B1
(45) Date of Patent: May 15, 2001

(54) POWER GENERATION SYSTEM AND METHOD

(75) Inventors: Jean Joseph Botti, Rochester Hills, MI (US); Malcolm James Grieve, Fairport, NY (US); Carl Elmer Miller, Millington, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/241,171

(22) Filed: Feb. 1, 1999

(51) Int. Cl.[7] ................................................. F01K 25/06
(52) U.S. Cl. ................................ 60/649; 60/734; 60/737
(58) Field of Search ............................. 60/643, 645, 649, 60/734, 737, 34.02

(56) References Cited

U.S. PATENT DOCUMENTS

| | | |
|---|---|---|
| 3,167,913 * | 2/1965 | Muhlberg et al. .................. 60/39.02 |
| 4,522,894 * | 6/1985 | Hwang et al. ......................... 429/17 |
| 4,597,170 | 7/1986 | Isenberg . |
| 4,728,584 | 3/1988 | Isenberg . |
| 4,729,931 | 3/1988 | Grimble . |
| 4,865,926 * | 9/1989 | Levy et al. ............................. 429/20 |
| 4,973,528 * | 11/1990 | Sanderson ............................. 429/12 |
| 5,047,299 | 9/1991 | Shockling . |
| 5,413,879 | 5/1995 | Domeracki et al. . |

* cited by examiner

Primary Examiner—Hoang Nguyen
(74) Attorney, Agent, or Firm—Vincent A. Cichosz

(57) ABSTRACT

The power generation system and method of the present invention employ a solid oxide fuel cell which reforms fuel to a degree which is controlled by the amount of fuel introduced to the solid oxide fuel cell. The effluent is directed preferably through a heat exchanger and then into an engine. This hybrid system more efficiently produces energy, both mechanical and electrical, over conventional systems.

65 Claims, 4 Drawing Sheets

POWER GENERATION SYSTEM AND METHOD

TECHNICAL FIELD

The present invention relates to a power generation system and method, and especially relates to a hybrid power generation system which employs various methods to generate electricity and/or mechanical power employing a solid oxide fuel cell.

BACKGROUND OF THE INVENTION

Alternative transportation fuels have been represented as enablers to reduce toxic emissions in comparison to those generated by conventional fuels. At the same time, tighter emission standards and significant innovation in catalyst formulations and engine controls has led to dramatic improvements in the low emission performance and robustness of gasoline and diesel engine systems. This has certainly reduced the environmental differential between optimized conventional and alternative fuel vehicle systems. However, many technical challenges remain to make the conventionally-fueled internal combustion engine a nearly zero emission system having the efficiency necessary to make the vehicle commercially viable.

Alternative fuels cover a wide spectrum of potential environmental benefits, ranging from incremental toxic and carbon dioxide emission improvements (reformulated gasoline, alcohols, LPG etc.) and to significant toxic and carbon dioxide emission improvements (natural gas, DME etc.). Hydrogen is clearly the ultimate environmental fuel, with potential as a nearly emission free internal combustion engine fuel (including $CO_2$ if it comes from a non-fossil source). Unfortunately, the market-based economics of alternative fuels or new power train systems are uncertain in the short to mid-term.

The automotive industry has made very significant progress in reducing automotive emissions for both the mandated test procedures and the "real world". This has resulted in some added cost and complexity of engine management systems, yet those costs are offset by other advantages of computer controls: increased power density, fuel efficiency, drivability, reliability and real-ime diagnostics.

Future initiatives to require zero emission vehicles appear to be taking us into a new regulatory paradigm where asymptotically smaller environmental benefits come at a very large incremental cost. Yet an "ultra low emission" certified vehicle can emit high emissions in limited extreme ambient and operating conditions or with failed or degraded components.

What is needed in the art is a power generation system which is compatible with conventional fuels and has essentially zero emissions and high efficiency.

SUMMARY OF THE INVENTION

The present invention relates to unique power generation systems and methods. In one embodiment, the system comprises: at least one SOFC capable of reforming fuel, said SOFC having a fuel side and an air side; a preheating device in fluid communication with said fuel side and said air side of said SOFC; an air supply in fluid communication with said preheating device such that air can be heated in said preheating device and then introduced to said air side of said SOFC; a fuel supply in fluid communication with said preheating device such that fuel can be burned, vaporized, atomized, or a combination thereof and then introduced to said fuel side of said SOFC; and at least one energy conversion device in fluid communication with an SOFC effluent from said fuel side of said SOFC.

In another embodiment, the system comprises: at least one SOFC capable of reforming fuel, said SOFC having an intake fuel side, an intake air side, an effluent fuel side and an effluent air side; a preheating device in fluid communication with said intake fuel side and said intake air side of said SOFC; an air supply in fluid communication with said preheating device such that air can be heated in said preheating device and then introduced to said air side of said SOFC; a fuel supply in fluid communication with said preheating device such that fuel can be burned, vaporized, atomized, or a combination thereof and then introduced to said fuel side of said SOFC; and at least one combustor in fluid communication with said effluent fuel side and said effluent air side.

One embodiment of a method of the present invention comprises: compressing an air stream to a first pressure; introducing fuel and said first compressed air to a preheating device; burning at least a first portion of said fuel in said preheating device to form a preheater effluent and a heated air stream; introducing said preheater effluent to a fuel side of a SOFC, said SOFC having an SOFC fuel effluent; and introducing said heated air stream to an air side of said SOFC, said SOFC having an SOFC air effluent.

Another embodiment of a method of the present invention comprises: compressing a heated air stream to a first pressure; vaporizing or atomizing a first portion of fuel in a preheating device to produce a preheater effluent; introducing preheater effluent to a fuel side of a an SOFC, said SOFC having an SOFC fuel effluent; introducing said first compressed air to an air side of said SOFC, said SOFC having an SOFC air effluent; heating said heated air with said SOFC fuel effluent; introducing said SOFC fuel effluent, said SOFC air effluent, and a second portion of fuel to an engine to produce an engine effluent; and introducing said engine effluent to a turbine.

Yet another embodiment of a method of the present invention comprises: compressing a heated air stream; vaporizing or atomizing fuel; introducing said fuel to a fuel side of an SOFC; applying a reverse potential to said SOFC such that the potential on the fuel side of said SOFC is negative; forming oxygen ions on said fuel side of said SOFC; migrating said oxygen ions from said fuel side to said air side of said SOFC to form an oxygen stream; and regenerating said catalytic converter by introducing said oxygen stream to said catalytic converter.

A further embodiment of a method of the present invention comprises: compressing a heated air stream to a first pressure; vaporizing or atomizing a first portion of fuel in a preheating device to produce a preheater effluent; introducing preheater effluent to a fuel side of a SOFC, said SOFC having an SOFC fuel effluent; introducing said first compressed air to an air side of said SOFC, said SOFC having an SOFC air effluent; introducing said SOFC fuel effluent and said SOFC air effluent to a combustor to form a combustor effluent; and introducing said combustor effluent to a turbine.

These and other features and advantages of the present invention will be apparent from the following brief description of the drawings, detailed description, and appended claims and drawings.

BRIEF DESCRIPTION OF THE DRAWINGS

Referring now to the drawings, which are meant to be exemplary not limiting, and wherein like elements are numbered alike in the several Figures, mass flows are illustrated with solid lines, and power flows are illustrated with broken lines.

DETAILED DESCRIPTION OF THE INVENTION

The present invention relates to power generation systems and methods for using the same. Generally, these systems may comprise one or more compressors, at least one solid oxide fuel cell ("SOFC"), an engine and/or an exhaust turbine, one or more heat exchangers, and optionally a catalytic converter, preheating device, electrical source, conventional connections, wiring, control valves, plasmatron, and a multiplicity of electrical loads, lights, resistive heaters, blowers, air conditioning compressors, starter motors, traction motors, computer systems, radio/stereo systems, and a multiplicity of sensors and actuators etc.

In one embodiment of the present invention, the system can be employed as the power source for a vehicle or another power conversion system requiring a high variable quantity of shaft and electrical power such as cogeneration of heat and electrical power, distributed electric infrastructure, and portable power systems, among others. The various flows and system controls are based upon the type of operation to be employed, e.g., start-up/cabin heating where quick heat up of the overall system is important, low power mode operation for conditions requiring less than about 10 kilowatts (kW) for a typical passenger vehicle, medium power mode operation for conditions requiring about 10 kW to about 80% of engine power, and high power mode operation for conditions requiring peak power (typically 100-150 kW). The powers given are typical for a larger passenger car. However, the systems of the present invention are suitable for use in applications of a few kilowatts up to several thousand kilowatts.

Start-Up/Cabin Heating Conditions

Start up conditions may cover the low and medium power modes (further described below) where the SOFC is rapidly brought to operating temperature and the engine is operated near the dilute, i.e. lean or with engine gas recycle, limit to nearly eliminate emissions prior to the catalyst reaching full operating temperature. In this mode the engine is fueled by reformate (SOFC effluent) generated by the SOFC (in systems where the SOFC is insulated and maintained at a high temperature) or by a fuel reformer (such as a plasmatron reformer) which heats and substantially reforms the fuel in the SOFC before the electrolyte is conductive.

Figure 1:
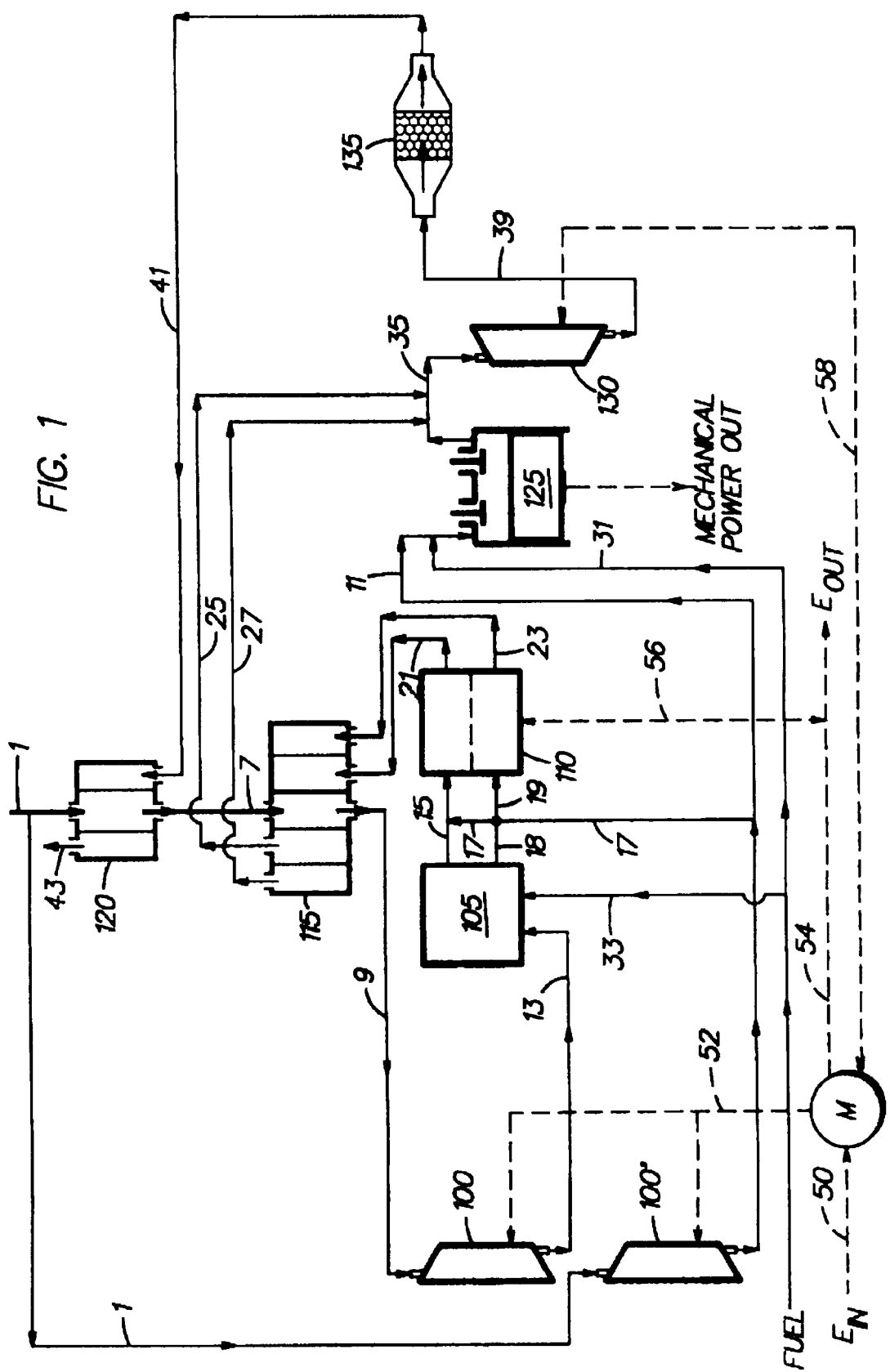
FIG. 1, is a schematic depiction of one embodiment of a system of the present invention which is designed for low and high total power output and start-up.
Figure 2:
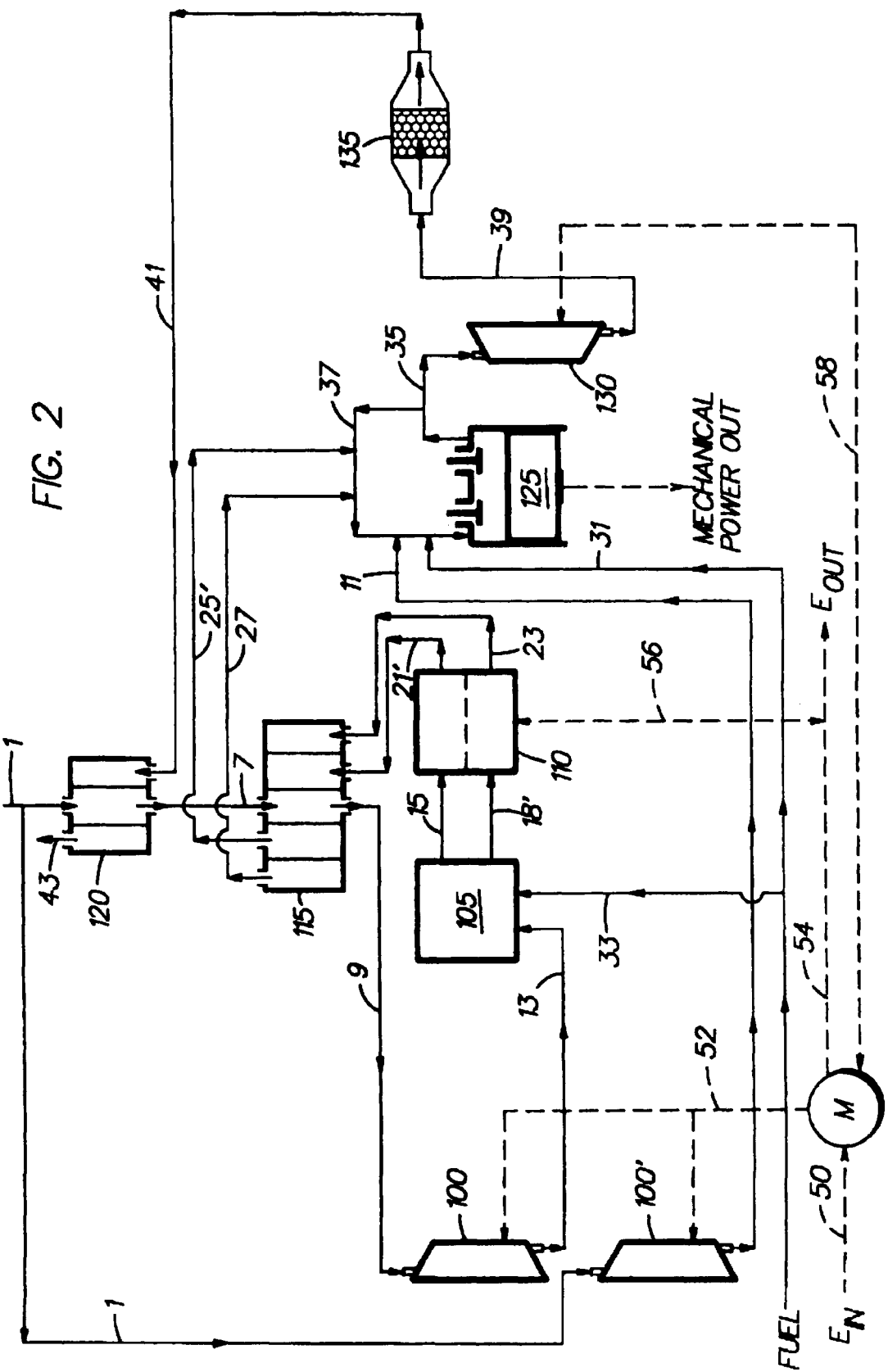
FIG. 2, is a schematic depiction of another embodiment of a system of the present invention which is designed for medium power output.

In one embodiment of the present invention, referring to FIGS. 1 and 2, the system shows air 1 entering optional heat exchanger 120 where it is heated from ambient temperature up to temperatures of about 100° C. or greater. This heated air 7 exits heat exchanger 120 and is directed into a second heat exchanger 115 where it is further heated, to temperatures of about 300° C. or greater, and directed as stream 9 to compressor 100. From compressor 100, the compressed air 13 enters a preheating device 105 where at least a portion of the air is burned with at least a portion of the fuel entering the preheating device 105 as stream 33.

In the start up mode, the preheating effluent 15 is directed to the fuel side of SOFC 110, rapidly heating SOFC 110. Preheating effluent 15 is preferably combined with additional compressed air from line 17, reacting with oxygen in the air and further heating the SOFC. Meanwhile, additional compressed air 13, which has been heated in preheating device 105 passes through lines 18 and 19 to the air side of the SOFC, thereby heating it. Waste heat may be additionally removed from the preheating device and/or SOFC effluent with a gas/coolant heat exchanger for improved, rapid passenger compartment heating in winter conditions (not shown). In other normal power modes the preheating device 105 is turned off or reduced to a low power mode such that it acts to regulate the SOFC temperature and to vaporize or atomize and mix the inputs to the fuel side of the SOFC. From the SOFC 110, the SOFC fuel effluent 21 comprises greater than about 50 vol. %, hydrogen and carbon monoxide, with $CO_2$, water and trace reaction products making up the balance, while the SOFC air effluent comprises oxygen depleted air 23. The SOFC effluent 21 and/or oxygen depleted air 23 may be supplied to the intake of exhaust side of the engine after cooling in a heat exchanger 115 allowing efficient dilute combustion with essentially zero emissions.

Oxygen Generation Mode

Referring to FIGS. 1 and 2, as is shown by electrical line 56, electricity can be directed into or removed from the SOFC. During normal system operation such as start-up/cabin heating, low power mode, medium power mode, and high power mode, electricity is produced by the SOFC which is removed via line 56 and directed via line 58 to an electrical source (motor/generator, battery, capacitor, or other device) for use in various areas of the system, or the electricity is directed out of the system via line 54 for an external use. In the oxygen generation mode, however, electricity is introduced to the SOFC via line 56 in order to establish a reverse electrical potential across the electrolyte within the SOFC.

Figure 3:
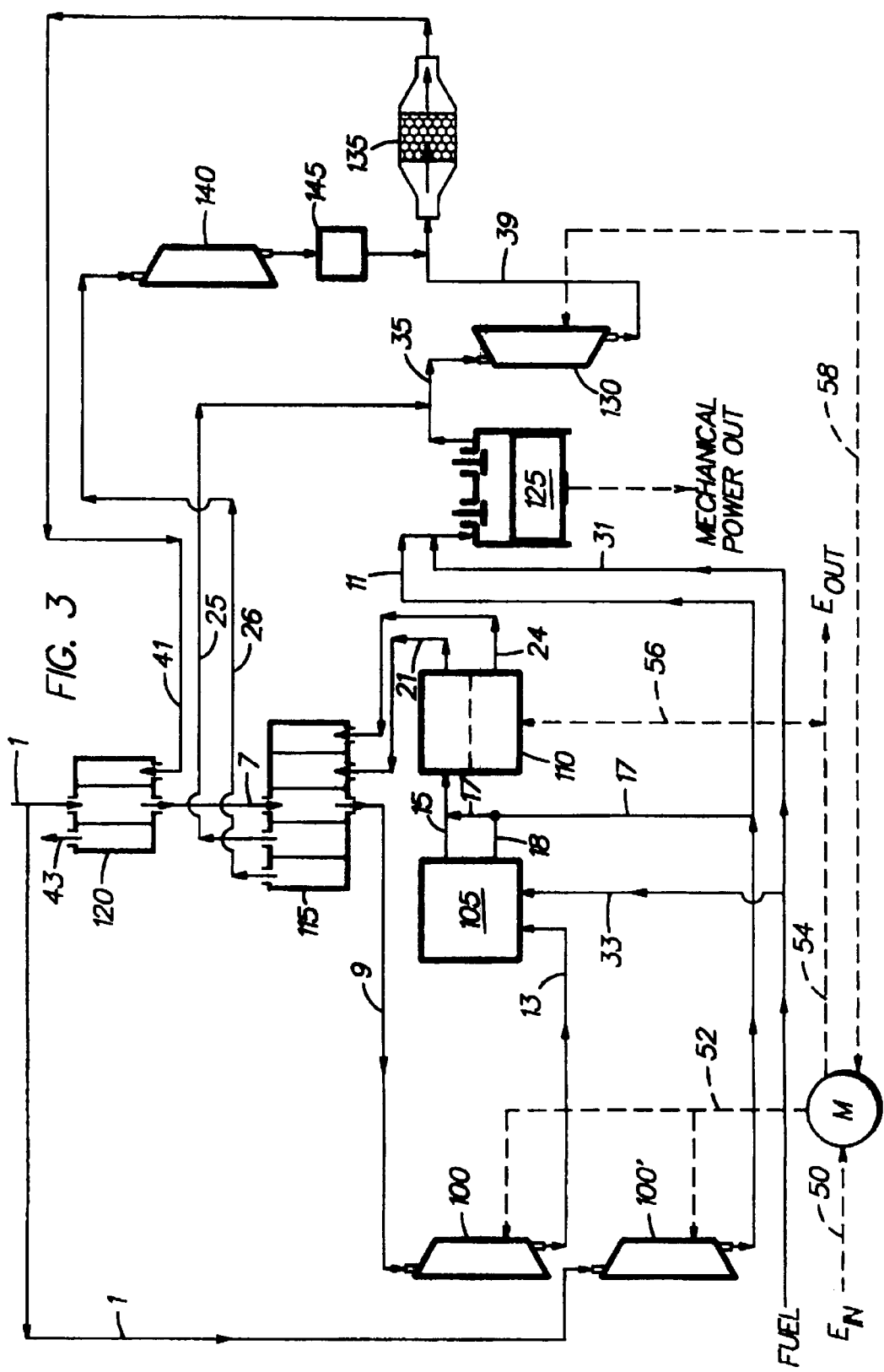
FIG. 3 is a schematic depiction of a further embodiment of a system of the present invention which uses a solid oxide fuel cell for oxygen generation.
Figure 4:
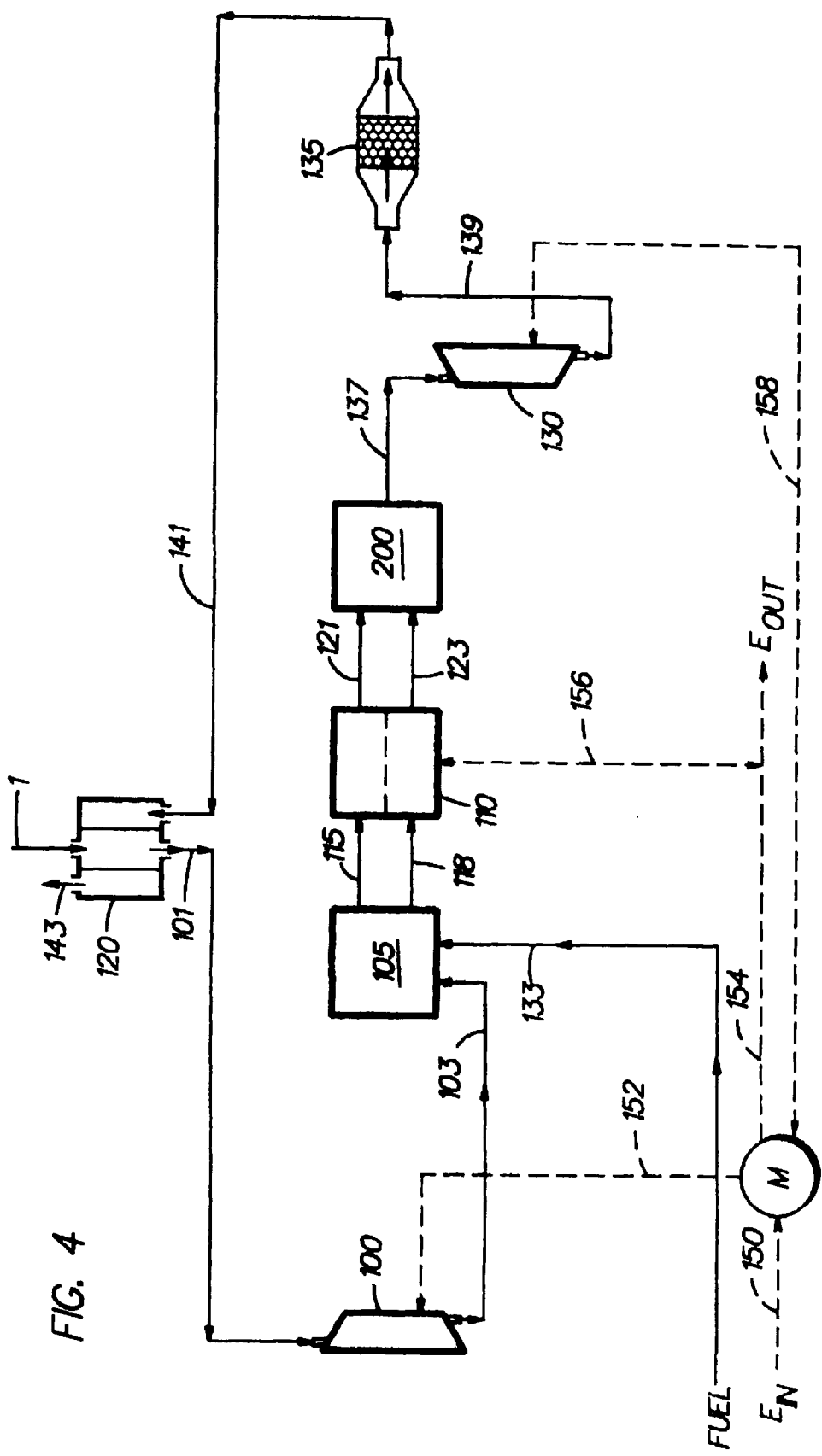
FIG. 4 is a schematic depiction of yet another embodiment of a system of the present invention, a solid oxide fuel cell/turbogenerator system which eliminates the use of an engine.

Referring to FIG. 3, the oxygen generation mode essentially comprises directing at least a portion of heated air 7 from heat exchanger 120, through compressor 100, and to preheating device 105, while the fuel 31 also enters preheating device 105 via line 33. A reverse electric potential is then applied across the electrolyte (negative potential on the fuel side and positive potential on the air side) within the SOFC 110 such that oxygen ions formed on the fuel side migrate across the electrolyte to the air side where they combine to form an oxygen stream. The oxygen stream can be pressurized and/or, partially or wholly, directed to a storage device (not shown) for future use such as: for emission control (catalyst heating or particulate trap regeneration), introduced into the engine in the start-up power mode, introduced into the engine effluent 35, and/or introduced into the air side of the SOFC, via line 19 (FIGS. 1 and 2) to boost its power output.

Low Power Mode Operation

In another embodiment of the present invention, referring to FIG. 1, air 1 passes through optional heat exchanger 120 where it is heated from ambient temperature up to temperatures of about 100° C. or greater. At least a portion of this heated air 7 exits heat exchanger 120 and is directed to compressor 100 where it is compressed prior to passing through preheating device 105. Meanwhile fuel 31 passes via line 33 to preheating device 105 where it is at least partially burned, and vaporized or atomized and directed as preheating effluent 15 into the fuel side of SOFC 110. Within the SOFC 110, oxygen in the air ionizes to $O^{-2}$, producing electricity. The electricity is directed from the SOFC 110 via line 56, while the oxygen ions migrate across the ceramic electrolyte to the fuel side where they react with the vaporized fuel to form mostly water and carbon dioxide with less than about 2% by volume (vol. %) in total, of hydrogen, carbon monoxide, and by-products; thereby forming an oxygen depleted air stream 23 and a SOFC fuel effluent stream 21. Both the oxygen depleted air stream 23 and the SOFC fuel effluent stream 21 are cooled in heat exchanger 115, then the SOFC fuel effluent stream 21 and/or oxygen depleted air stream 23 are directed via lines 25 and 27, respectively, and 35 to turbine 130 to produce electricity and/or power for vehicle operation. From the turbine 130, the turbine effluent stream 39 preferably passes through a catalytic converter 135 to remove trace quantities of unburned and partially burned fuel from the exhaust stream. Then the exhaust gas 41 is preferably cooled in heat exchanger 120 and vented to the environment via line 43. Note that the engine 125 is off in the low power mode and electrical power is generated at very high efficiency for operation of the power train and vehicle accessories, with efficiencies of up to and exceeding about 60%.

Medium Power Mode Operation

In another embodiment of the present invention, referring to FIG. 2, air 1 passes through optional heat exchanger 120. At least a portion of this heated air 7 exits heat exchanger 120 and is directed to compressor 100, preferably through preheating device 105 and vial line 18', to the air side of the SOFC 110. Meanwhile at least a portion of fuel 31 passes via line 33 to preheating device 105 where it is vaporized or atomized and directed as preheating effluent 15 into the fuel side of SOFC 110. Within the SOFC 110, oxygen in the air ionizes to $O^{-2}$, producing electricity. The electricity is directed from the SOFC 110 via line 56, while the oxygen ions migrate across the ceramic electrolyte to the fuel side where they react with the vaporized fuel to form mostly hydrogen and carbon monoxide, typically about 20 vol. % to about 80 vol. % or more, with smaller amounts of vaporized fuel, water, carbon dioxide and other by-products comprising the balance; thereby forming an oxygen depleted air stream 23 and a SOFC fuel effluent stream 21'. Both the oxygen depleted air stream 23 and the SOFC fuel effluent stream 21' are cooled in heat exchanger 115 and the cooled SOFC effluent stream 25', as well as cooled oxygen depleted air stream 27, compressed air 11, fuel 31, and optionally exhaust recirculation stream 37 (typically comprising up to about 20 vol. % of the engine effluent 35) enter the engine 125 where the fuel is burned. The remainder of the engine effluent 35 enters turbine 130 where electricity and/or power for vehicle operation are produced. The turbine effluent stream 39 preferably passes through a catalytic converter 135 to remove trace emissions of hydrocarbons, carbon monoxides, nitric oxide, and particulates prior to exiting the system, combining with the cooled oxygen depleted air stream 27, if any, or passing through heat exchanger 115.

High Power Mode Operation

Essentially, another embodiment of the present invention, the high power mode operation, is the same as the low power mode operation except the engine is operating at near peak power, the SOFC and engine are operating in parallel, and the engine is entirely fueled with unheated air and fuel. Referring to FIG. 1, air 1 is directed to an optional compressor 100' where it is can be compressed prior to combining with at least a portion of fuel 31 and entering the engine 125 which produces engine effluent 35. Meanwhile at least a portion of fuel 31 passes via line 33 to preheating device 105 where it is vaporized or atomized, and partially burned, and directed as preheating effluent 15 into the fuel side of SOFC 110. Heated air 7, which is compressed in compressor 100, also passes through preheating device 105 prior to entering the air side of the SOFC 110.

Within the SOFC 110, oxygen in the air ionizes to $O^{-2}$, producing electricity. The electricity is directed from the SOFC 110 via line 56, while the oxygen ions migrate across the ceramic electrolyte to the fuel side where they react with the vaporized fuel to form mostly water and carbon dioxide, with smaller amounts of hydrogen, carbon monoxide, and by-products comprising the balance; thereby forming an oxygen depleted air stream 23 and a SOFC fuel effluent stream 21. Both the oxygen depleted air stream 23 and the SOFC fuel effluent stream 21 are cooled in heat exchanger 115, with a portion of the oxygen depleted air stream 23 optionally introduced after the exhaust turbine 130 into an optional two-stage catalyst 135 (e.g. a dual bed converter). Alternatively, the SOFC fuel effluent stream 21 and oxygen depleted air stream 23 are directed via lines 25 and 27, along with engine effluent 35, to the turbine 130. Within the turbine 130 electricity and/or power for vehicle operation are produced. The turbine effluent stream 39 then preferably passes through a catalytic converter 135 to remove any hydrocarbons, unburned fuel, nitric oxide, carbon monoxide and particulates from the exhaust stream prior to exiting the system, combining with the cooled oxygen depleted air stream 27, if any, or passing through heat exchanger 115.

As explained in the embodiments described above, the air is preferably compressed prior to introduction into the SOFC 110. Although two compressors are shown in FIGS. 1 and 2, it is understood that one or more compressors can be employed. The type of compressor is dependent upon the particular application. For example, with a conventional compressor capable of compressing to moderate pressures (up to about 3 atmospheres absolute pressure) typically employed in turbocharged engines useful for the embodiments shown in FIGS. 1 and 2, and with the pressure controlled to optimize the power output and efficiency of the SOFC and/or the engine as a system; with similar pressures preferably employed in the SOFC and the intake manifold in order to simplify system design. For uses within a vehicle, the pressure can be up to or exceeding about 2 atmospheres (absolute pressure) with about 1 to about 2 atmospheres (absolute pressure) preferred. The compressor can be a mechanical device driven, for example, by direct connection to the exhaust turbine or by a mechanical supercharger, or can be operated independently via electricity or hydraulics.

SOFC employed with the present invention preferably possess greater fuel reformer capabilities than most conventional SOFC. For example, the SOFC is preferably designed with an enlarged reformer capability such that fuel is substantially dissociated into hydrogen and carbon monoxide even when the reformate carbon and hydrogen is not fully consumed at the electrodes. Improving the reformer capabilities of the SOFC can be obtained by adjusting the amount and type of catalyst employed, the surface area of the catalyst, the operating temperature of the SOFC (which is also catalyst dependent), and the flow rate of the air and fuel streams.

It is envisioned that multiple SOFCs can be employed, in series or in parallel, on the induction side of the engine, or even with one or more SOFCs on the exhaust side of the engine. If located on the exhaust side of the engine, the SOFC would preferably receive fuel and engine effluent, and optionally air, in the fuel side of the SOFC, and air on the air side of the SOFC. The SOFC effluent (fuel side) could be directed through a turbine, catalytic converter, and/or heat exchanger (to heat the system intake air). It would be preferable to direct the engine effluent directly from the engine to the SOFC effluent to ensure the engine effluent had a sufficient temperature to operate the SOFC efficiently, i.e. about 600° C. to about 800° C. or so. The oxygen depleted air stream from the SOFC could pass through a turbine and/or catalytic converter.

The SOFC can employ conventional catalysts capable of producing a high hydrogen and carbon monoxide yield. Possible catalysts include noble metal-based catalysts and alloys thereof, among others, with rhodium-based catalysts and alloys thereof typically preferred due to their efficiency and resistance to sulfur and carbon poisoning.

Within the SOFC, the ionization of the oxygen produces electricity which can be directly utilized by the vehicle to power various electrical parts, including, but not limited to, lights, resistive heaters, blowers, air conditioning compressors, starter motors, traction motors, computer systems, radio/stereo systems, and a multiplicity of sensors and actuators, among others. Unlike conventional motor vehicles, the electricity produced by the SOFC is direct current which can be matched to the normal system voltage of the vehicle, thereby avoiding the requirements for devices such as diodes, voltage conversion and other losses, such as resistive losses in the wiring and in/out of the battery, associated with conventional vehicle systems and traditional hybrid electrical systems. This high efficiency electricity allows efficient electrification of the vehicle, including functions such as air conditioning and others, allowing weight, fuel economy and performance advantages compared to conventional hybrid electric mechanization and conventional internal combustion engine systems.

During start-up and for cabin heating, the SOFC can be operated at high adiabatic temperatures, e.g. up to about 1,000° C., subject to catalyst limitations, with typical operating temperatures ranging from about 600° C. to about 900° C., and preferably about 650° C. to about 800° C. In order to be introduced into the intake of an engine, however, the SOFC effluent, i.e. reformate, should be at a low temperature, i.e. a temperature below about 350° C., with a temperature of about 150° C. to about 400° C. preferred prior to entering the engine. Consequently, at least one heat exchanger is preferably employed to cool the SOFC effluent and conversely heat the air prior to entering the SOFC. Possible heat exchangers include conventional heat exchangers compatible with the environment within the system.

The fuel utilized in the system is typically chosen based upon the application, and the expense, availability, and environmental issues relating to the fuel. Possible fuels include conventional fuels such as hydrocarbon fuels, including, but not limited to, conventional liquid fuels, such as gasoline, diesel, ethanol, methanol, kerosene, and others, conventional gaseous fuels, such as natural gas, propane, butane, and others; and alternative or "new" fuels, such as hydrogen, biofuels, Fischer Tropsch, dimethyl ether, and others; and combinations thereof. The preferred fuel is typically based upon the type of engine employed, with lighter fuels, i.e. those which can be more readily vaporized, conventional fuels which are readily available to consumers, and high hydrogen to carbon ratio fuels generally preferred.

The other major component beside the SOFC which is typically employed by the system of the present invention to produce tractive power for a vehicle is the engine. Within the engine, air and fuel, and/or SOFC effluent are burned to produce energy. The engine can be any conventional combustion engine, such as an internal combustion engine, including, but not limited to, spark ignited and compression ignited engines, including, but not limited to, variable compression engines.

Similar to the engine, the turbine can be employed to recover energy from the engine effluent to produce tractive power and further to recover energy to operate the compressor(s) and preferably to generate electricity for various uses throughout the system and/or vehicle. The turbine employed can be any conventional turbine used for automotive or power generation energy conversion.

In a preferred embodiment, the exhaust turbine and compressor may be accelerated or decelerated by a motor, generator, or other device, to increase the compression (when required to increase the compression for optimal system performance) or to decrease compression (when excessive energy is available in the exhaust gases). For example, a high speed electrical machine can be linked to the turbine and compressor on a single shaft.

After passing through the turbine, the engine effluent preferably enters a catalytic converter in order to ensure extremely low, essentially zero emissions of hydrocarbons and nitric oxide, carbon monoxide, and particulates. The catalytic converter is typical of those used in automotive applications, including, but not limited to, particulate traps, dual bed converters, and those employing (1) noble metals and alloys thereof, such as platinum, rhodium and palladium catalysts and alloys thereof, among others and/or (2) particulate filtering and destruction.

Optional equipment which additionally may be employed with the present system include, but are not limited to, sensors and actuators, heat exchangers, (power mode) a battery, fuel reformer, burner, phase change material, thermal storage system, plasma trom, an ultra capacitor, and/or a desulfurizer which may be employed if the fuel is rich in sulfur, or if the catalyst employed in the SOFC is particularly intolerant to sulfur, such as nickel-based catalysts, among other conventional equipment.

In contrast to conventional vehicles and even to prior art systems which employ fuel cells, the system of the present invention does not require the use of a battery. Although a small battery relative to a battery utilized in a conventional vehicle operated at peak power train power will be employed as a buffer back-up system, it may even be very small relative to those used in other hybrid electric systems.

It has been discovered that utilization of the systems of the present invention can improve fuel efficiency. For example, when about 5.4 vol. fuel is reacted in a partial oxidation or catalytic reformer:

$$C_7H_{12}+3.5O_2+14N_2 \rightarrow 7CO+6H_2+14N_2$$

about 48 vol. % fuel is produced for introduction into the engine. When the system of the present invention is employed, however, using 11.8 vol. % fuel in the SOFC:

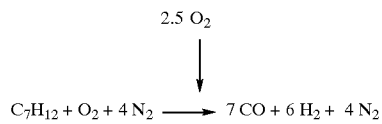

about 68 vol. % fuel is produced for introduction into the engine.

The various embodiments of the present invention provide advantages over the prior art in that they: (1) provide electrical power that is cheaper than shaft power in terms of fuel efficiency; (2) reduce or eliminate the need for batteries in a hybrid electric vehicle (the SOFC can operate with the engine off to supply electric accessories and modest tractive power (up to or exceeding about 10 kilowatts (kW) for a light duty passenger vehicle); (3) provide an efficiency benefit since conventional fuel reformers consume electricity, and the SOFC of the present invention performs the reforming function while producing electricity; (4) enable low to essentially zero emissions due to the ability to combust lean mixtures, fuel the engine with reformate only (in start-up mode), and very dilute (lean or engine gas recycle) engine operation is possible in the medium power mode, thereby inhibiting the production of nitric oxides; (5) increase overall system efficiency, up to or exceeding about 60% at light load and about 45% at heavy load; and (6) are compatible with advanced combustion systems such as homogenous charge compression ignition, "HCCI", where heated engine intake and extreme engine gas recycle rates are an advantage.

The SOFC can stay relatively small compared to total powertrain power so that a large efficiency benefit is possible for a light duty application (with a wide range of power output and large duty cycle of light load operation). The SOFC can then be miniaturized and mass produced while the conventional internal combustion engine can now meet the cost density and emissions requirements, and the power density required by the consumer but at extremely low emission levels required by society.

The embodiments of the present system and method, although mostly described in relation to utilization within a vehicle, can be utilized in numerous applications, including, but not limited to: cogeneration of electrical power and heat (with liquid coolant loops added to recover waste heat for various applications such as space heating), distributed electric power generations, and portable power generation.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A power generation system, comprising:
   (a) at least one SOFC capable of reforming fuel, said SOFC having a fuel side and an air side;
   (b) a preheating device in fluid communication with said fuel side and said air side of said SOFC;
   (c) an air supply in fluid communication with said preheating device such that air can be heated in said preheating device and then introduced to said air side of said SOFC;
   (d) a fuel supply in fluid communication with said preheating device such that fuel can be burned, vaporized, atomized, or a combination thereof and then introduced to said fuel side of said SOFC; and
   (e) at least one energy conversion device in fluid communication with an SOFC effluent from said fuel side of said SOFC.

2. A power generation system as in claim 1, wherein said energy conversion device is an engine, turbine, or a combination thereof.

3. A power generation system as in claim 1, wherein said energy conversion device is an engine in fluid communication with said SOFC effluent and said air supply, said engine having an engine effluent in fluid communication with a turbine.

4. A power generation system as in claim 3, further comprising a second SOFC having a second fuel side and a second air side and a second SOFC effluent, wherein said second fuel side is in fluid communication with said engine effluent, said second air side in fluid communication with said air supply, and said second SOFC effluent is in fluid communication with said turbine.

5. A power generation system as in claim 4, wherein said engine is further in fluid communication with said fuel supply.

6. A power generation system as in claim 3, wherein said engine is further in fluid communication with said fuel supply.

7. A power generation system as in claim 3, further comprising a catalytic converter having an inlet, wherein said inlet is in fluid communication with said energy conversion device.

8. A power generation system as in claim 1, further comprising at least one heat exchanger in fluid communication with said SOFC effluent and said air supply such that air can pass through said heat exchanger prior to introduction to said air side of said SOFC, and said SOFC effluent can pass through said heat exchanger prior to introduction to said energy conversion device.

9. A power generation system as in claim 1, further comprising at least one compressor in fluid communication with said air supply and said SOFC.

10. A power generation system as in claim 1, wherein said preheating device is a burner, plasmatron, vaporizer, reformer, heat exchanger, or combination thereof.

11. A power generation system as in claim 1, further comprising a catalytic converter in fluid communication with said energy conversion device.

12. A power generation system, comprising:
   (a) at least one SOFC capable of reforming fuel, said SOFC having an intake fuel side, an intake air side, an effluent fuel side and an effluent air side;
   (b) a preheating device in fluid communication with said intake fuel side and said intake air side of said SOFC;
   (c) an air supply in fluid communication with said preheating device such that air can be heated in said preheating device and then introduced to said air side of said SOFC;
   (d) a fuel supply in fluid communication with said preheating device such that fuel can be burned, vaporized, atomized, or a combination thereof and then introduced to said fuel side of said SOFC; and
   (e) at least one combustor in fluid communication with said effluent fuel side and said effluent air side.

13. A power generation system as in claim 12, wherein said combustor is a catalytic combustor, plasmatron, or a combination thereof.

14. A power generation system as in claim 12, wherein said combustor has a combustor effluent in fluid communication with a turbine.

15. A power generation system as in claim 14, further comprising a catalytic converter in fluid communication with said turbine.

16. A power generation system as in claim 12, further comprising a catalytic converter in fluid communication with said combustor.

17. A power generation system as in claim 12, wherein said combustor has a combustor effluent in fluid communication with a heat exchanger, said heat exchanger in fluid communication with an air supply such that said air supply can be heated in said heat exchanger to form a heated air stream.

18. A power generation system as in claim 12, further comprising at least one compressor in fluid communication with an air supply and said preheating device.

19. A power generation system as in claim 18, further comprising at least one compressor in fluid communication with said heated air stream and said preheating device.

20. A power generation system as in claim 12, wherein said preheating device is a burner, plasmatron, vaporizer, reformer, heat exchanger, or combination thereof.

21. A method for operating a power generation system, comprising the steps of:
    (a) compressing an air stream to a first pressure;
    (b) introducing fuel and said first compressed air to a preheating device;
    (c) burning at least a first portion of said fuel in said preheating device to form a preheater effluent and a heated air stream;
    (d) introducing said preheater effluent to a fuel side of a SOFC, said SOFC having an SOFC fuel effluent; and
    (e) introducing said heated air stream to an air side of said SOFC, said SOFC having an SOFC air effluent.

22. A method for operating a power generation system as in claim 21, further comprising heating said air stream with said SOFC fuel effluent.

23. A method for operating a power generation system as in claim 22, further comprising heating said air stream with said SOFC air effluent.

24. A method for operating a power generation system as in claim 23, further comprising vaporizing or atomizing a second portion of said fuel; and directing said SOFC fuel effluent and said SOFC air effluent through a turbine.

25. A method for operating a power generation system as in claim 24, further comprising directing a turbine effluent through a catalytic converter.

26. A method for operating a power generation system as in claim 25, further comprising heating said air stream with catalytic converter effluent.

27. A method for operating a power generation system as in claim 24, further comprising heating said air stream with turbine effluent.

28. A method for operating a power generation system as in claim 24, further comprising compressing a portion of said air stream to a second pressure and introducing said second compressed air to said air side of said SOFC.

29. A method for operating a power generation system as in claim 23, further comprising:
    vaporizing or atomizing a second portion of said fuel;
    burning said SOFC fuel effluent with said SOFC air effluent in an engine; and
    directing engine effluent through a turbine.

30. A method for operating a power generation system as in claim 29, further comprising introducing at least a portion of said fuel to said engine.

31. A method for operating a power generation system as in claim 30, further comprising compressing a portion of said air stream to a second pressure and introducing said second compressed air to said fuel side of said SOFC.

32. A method for operating a power generation system as in claim 31, further comprising compressing a portion of said air stream to a second pressure and introducing a portion of said second compressed air to said air side of said SOFC.

33. A method for operating a power generation system as in claim 30, further comprising compressing a portion of said air stream to a second pressure and introducing said second compressed air to said air side of said SOFC.

34. A method for operating a power generation system as in claim 21, further comprising introducing said SOFC fuel effluent and said SOFC air effluent to a heat exchanger to heat a coolant.

35. A method for operating a power generation system as in claim 34, further comprising heating an environment with said heated coolant, wherein said environment is a passenger compartment, building or engine.

36. A method for operating a power generation system as in claim 21, further comprising introducing said preheater effluent to a heat exchanger to heat a coolant.

37. A method for operating a power generation system as in claim 36, further comprising heating an environment with said heated coolant, wherein said environment is a passenger compartment, building or engine.

38. A method for operating a power generation system as in claim 21, further comprising introducing an oxygen stream to said air side of said SOFC.

39. A method for operating a power generation system, comprising the steps of:
    (a) compressing a heated air stream to a first pressure;
    (b) vaporizing or atomizing a first portion of fuel in a preheating device to produce a preheater effluent;
    (c) introducing preheater effluent to a fuel side of a an SOFC, said SOFC having an SOFC fuel effluent;
    (d) introducing said first compressed air to an air side of said SOFC, said SOFC having an SOFC air effluent;
    (e) heating said heated air with said SOFC fuel effluent;
    (f) introducing said SOFC fuel effluent, said SOFC air effluent, and a second portion of fuel to an engine to produce an engine effluent; and
    (g) introducing said engine effluent to a turbine.

40. A method for operating a power generation system as in claim 39, further comprising compressing air; and introducing said compressed air to said engine.

41. A method for operating a power generation system as in claim 40, further comprising heating said heated air with said SOFC air effluent.

42. A method for operating a power generation system as in claim 40, further comprising recycling at least a portion of said engine effluent through said engine.

43. A method for operating a power generation system as in claim 42, further comprising introducing turbine effluent to a catalytic converter.

44. A method for operating a power generation system as in claim 43, further comprising heating said heated air with catalytic converter effluent.

45. A method for operating a power generation system as in claim 40, further comprising introducing turbine effluent to a catalytic converter.

46. A method for operating a power generation system as in claim 40, further comprising burning at least a portion of said first portion of fuel.

47. A method for operating a power generation system as in claim 39, further comprising burning at least a portion of said first portion of fuel.

48. A method for operating a power generation system as in claim 39, further comprising heating said first compressed air in said preheating device.

49. A method for operating a power generation system as in claim 39, further comprising introducing said SOFC fuel effluent and said SOFC air effluent to a heat exchanger to heat a coolant.

50. A method for operating a power generation system as in claim 49, further comprising heating an environment with said heated coolant, wherein said environment is a passenger compartment, building or engine.

51. A method for operating a power generation system as in claim 39, further comprising introducing said preheater effluent to a heat exchanger to heat a coolant.

52. A method for operating a power generation system as in claim 51, further comprising heating an environment with said heated coolant, wherein said environment is a passenger compartment, building or engine.

53. A method for operating a power generation system as in claim 39, further comprising introducing an oxygen stream to said air side of said SOFC.

54. A method for regenerating a catalytic converter, comprising the steps of:
- (a) compressing a heated air stream;
- (b) vaporizing or atomizing fuel;
- (c) introducing said fuel to a fuel side of an SOFC;
- (d) applying a reverse potential to said SOFC such that the potential on the fuel side of said SOFC is negative;
- (e) forming oxygen ions on said fuel side of said SOFC;
- (f) migrating said oxygen ions from said fuel side to said air side of said SOFC to form an oxygen stream; and
- (g) regenerating said catalytic converter by introducing said oxygen stream to said catalytic converter.

55. A method for regenerating a catalytic converter as in claim 54, further comprising compressing said oxygen stream prior to regenerating said catalytic converter.

56. A method for operating a power generation system, comprising the steps of:
- (a) compressing a heated air stream;
- (b) combining said compressed heated air stream with fuel to form a combined stream;
- (c) introducing said combined stream to a fuel side of an SOFC;
- (d) applying a reverse potential to said SOFC such that the potential on said fuel side of said SOFC is negative;
- (e) forming oxygen ions on said fuel side of said SOFC;
- (f) migrating said oxygen ions from said fuel side to said air side of said SOFC to form an oxygen stream; and
- (g) heating said heated air stream with said oxygen stream and a SOFC fuel effluent stream from said fuel side of said SOFC;
- (h) introducing a second portion of fuel, a second compressed air stream, and said oxygen stream to an engine to form an engine effluent; and
- (i) introducing the engine effluent and the SOFC fuel effluent to a turbine to form a turbine effluent.

57. A method for operating a power generation system as in claim 56, further comprising directing the turbine effluent through a catalytic converter.

58. A method for operating a power generation system as in claim 56, further comprising heating said heated air stream with said SOFC fuel effluent and said oxygen stream.

59. A method for operating a power generation system, comprising the steps of:
- (a) compressing a heated air stream to a first pressure;
- (b) vaporizing or atomizing a first portion of fuel in a preheating device to produce a preheater effluent;
- (c) introducing preheater effluent to a fuel side of a an SOFC, said SOFC having an SOFC fuel effluent;
- (d) introducing said first compressed air to an air side of said SOFC, said SOFC having an SOFC air effluent;
- (e) introducing said SOFC fuel effluent and said SOFC air effluent to a combustor to form a combustor effluent; and
- (f) introducing said combustor effluent to a turbine.

60. A method for operating a power generation system as in claim 59, further comprising introducing turbine effluent to a catalytic converter.

61. A method for operating a power generation system as in claim 60, further comprising heating said heated air stream with catalytic converter effluent.

62. A power generation system comprising:
- (a) at least one SOFC capable of reforming fuel, said SOFC having a fuel side and an air side;
- (b) a preheating device in fluid communication with said fuel side and said air side of said SOFC;
- (c) an air supply in fluid communication with said preheating device such that air can be heated in said preheating device and introduced to said air side of said SOFC;
- (d) a fuel supply in fluid communication with said preheating device such that fuel can be burned, vaporized, atomized, or a combination thereof and introduced to said fuel side of said SOFC; wherein electricity produced by said SOFC is used to operate a powertrain, operate vehicle accessories, or a combination thereof.

63. A power generation system as in claim 62, wherein electricity produced by said SOFC supplies all of a vehicle's tractive power.

64. A method for operating a power generation system comprising:
- (a) introducing fuel and air to a preheating device;
- (b) burning at least a first portion of said fuel in said preheating device to form a preheater effluent and a heated air stream;
- (c) introducing said preheater effluent to a fuel side of a SOFC;
- (d) introducing said heated air stream to an air side of said SOFC; and
- (e) using electricity produced by said SOFC to operate a powertrain, operate vehicle accessories, or a combination thereof.

65. A method for operating a power generation system as in claim 64, comprising:

using electricity produced by said SOFC to supply all of a vehicle's tractive power.

\* \* \* \* \*